United States Patent [19]
Bernard et al.

[11] Patent Number: 5,464,506
[45] Date of Patent: Nov. 7, 1995

[54] ELECTROLYTIC DEVICE AND METHOD HAVING A POROUS AND STIRRING ELECTRODE

[75] Inventors: Patrick E. Y. Bernard, Chagny; Claude R. Bertorelli, Dracy le Fort, both of France

[73] Assignee: Eastman Kodak Company, Rochester, N.Y.

[21] Appl. No.: 199,262

[22] PCT Filed: Sep. 3, 1992

[86] PCT No.: PCT/EP92/02032
 § 371 Date: Feb. 24, 1994
 § 102(e) Date: Feb. 24, 1994

[87] PCT Pub. No.: WO93/05203
 PCT Pub. Date: Mar. 18, 1993

[30] Foreign Application Priority Data

Sep. 6, 1991 [FR] France .................................. 91 11233

[51] Int. Cl.$^6$ ........................................ C25C 1/20
[52] U.S. Cl. .................. 204/105 R; 204/109; 204/222
[58] Field of Search ......................... 264/105 R, 109, 264/130, 149, 151, 198, 253, 283, 284, 290 R, 222

[56] References Cited

U.S. PATENT DOCUMENTS

| | | | |
|---|---|---|---|
| 4,399,020 | 8/1983 | Branchick et al. | 204/269 |
| 4,515,672 | 5/1985 | Platek et al. | 204/269 |
| 4,517,064 | 5/1985 | Cook | 204/105 R |
| 4,737,257 | 4/1988 | Boulton | 204/291 |
| 4,776,941 | 10/1988 | Tezanos | 204/259 |
| 4,832,813 | 5/1989 | Williamson et al. | 204/272 |
| 4,834,847 | 5/1989 | McIntyre | 204/81 |
| 4,834,850 | 5/1989 | de Nora et al. | 204/109 |
| 4,913,779 | 4/1990 | Lacoste | 204/1.11 |

FOREIGN PATENT DOCUMENTS

| | | |
|---|---|---|
| 0171647 | 2/1986 | European Pat. Off. . |
| 0183602 | 6/1986 | European Pat. Off. . |
| 0252172 | 1/1988 | European Pat. Off. . |
| 661883 | 7/1929 | France . |
| 142896 | 7/1903 | Germany . |
| 3347100 | 7/1985 | Germany . |
| 53/4717 | 1/1978 | Japan . |
| 55/8416 | 1/1980 | Japan . |
| 880495 | 11/1981 | U.S.S.R. . |
| 2078782 | 1/1982 | United Kingdom . |

*Primary Examiner*—John Niebling
*Assistant Examiner*—Brendan Mee
*Attorney, Agent, or Firm*—Paul A. Leipold

[57] ABSTRACT

The present invention relates to an electrolytic device.

The electrolytic device comprises at least one porous stirring electrode associated with at least one counter-electrode, as well as a method for treating the effluents with this device.

These electrolytic device and method can be applied, for example, to the recovery, the recycling and the purification, in concentrated or dilute solution, of compounds exhibiting redox properties. The efficiency of the electrolytic device is clear in FIG. 3, which shows the amount of silver recovered with the electrode of the invention (3b) and with a non-stirring electrode (3a).

11 Claims, 10 Drawing Sheets

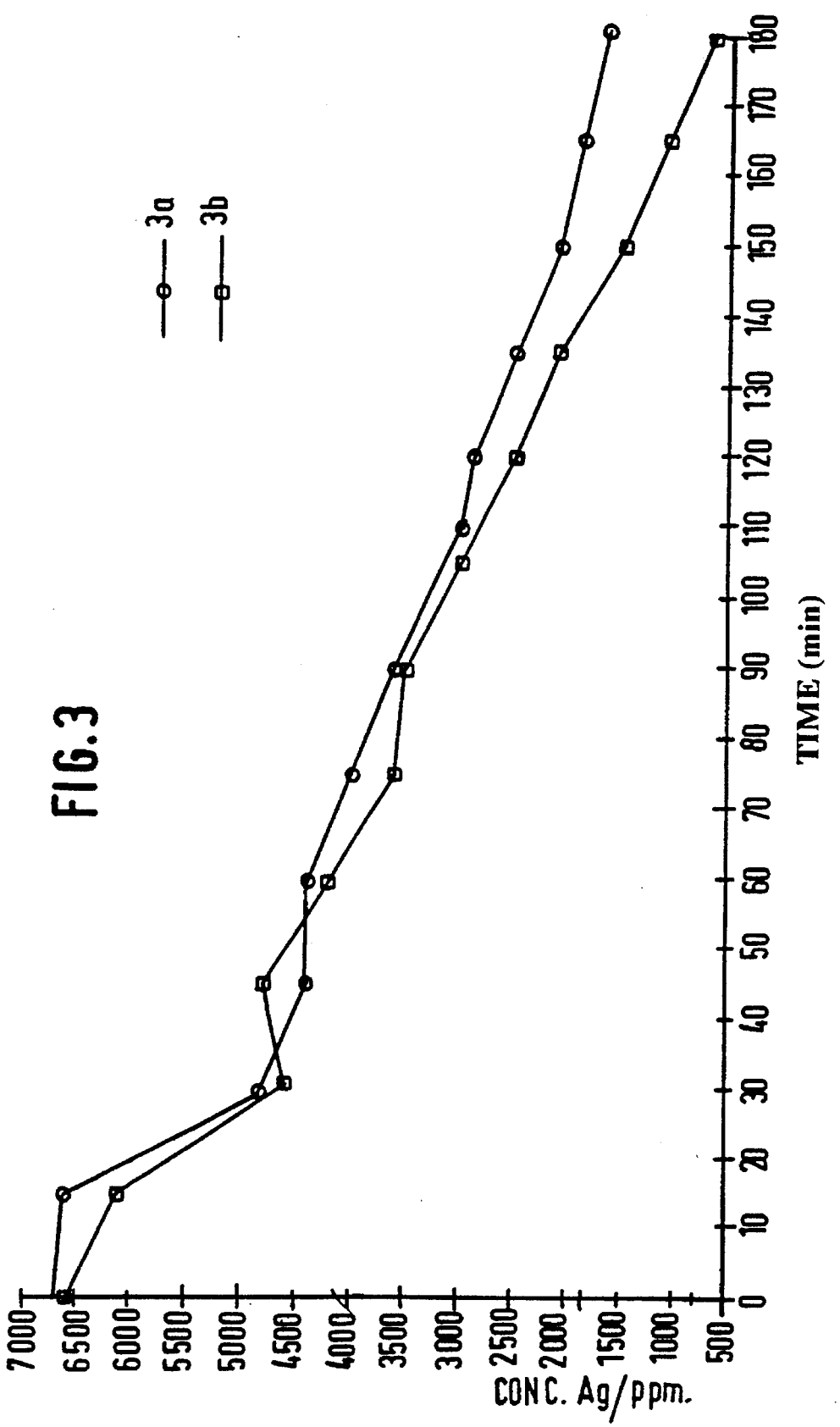

ELECTROLYTIC DEVICE AND METHOD HAVING A POROUS AND STIRRING ELECTRODE

The present invention relates to an electrolytic device comprising at least one porous stirring electrode associated with at least one counter-electrode, as well as a method for processing the effluents by means of this device. This electrolytic device and method can be applied, for example, to the recovery, recycling and purification, in a concentrated or dilute solution, of compounds exhibiting redox properties.

In the case of effluents containing metallic ions, the present invention allows the discharge of these effluents into the sewer, after treatment by means of the device according to the invention, without causing environmental problems. Moreover, the device and method according to the present invention are easy to use technically and are economical. This device and method are particularly effective for treating photographic effluents.

It is known that the efficiency of electrolytic devices can be improved by increasing both the electrolytically active surface, which is the effective surface area on which the electrolytic deposition is performed, and the mass transfer coefficient, which accounts for the matter deposited on the active surface of the electrode, while maintaining good electrical conduction between the electrolyte and the electrode. The prior art proposes various solutions in order to attempt to overcome these different problems.

The electrolytically active surfaces were improved by using for example, cells comprising electrodes consisting of porous or fibrous materials, or cells with volume electrodes consisting of a bed of conductive particles. The mass transfer was increased, for example, by stirring of the electrolyte. This stirring can be obtained by means of moving electrodes, by percolation of the electrolyte through the bed of conductive particles in the case of volume electrodes or by injection of an inert gas into the cell.

European Patent 71,443 discloses an electrolytic device for treating waste waters which consists of porous cathodes associated with perforated solid anodes to allow the electrolyte to pass through the cell. These electrodes are called "moving electrodes" because the fixing of these electrodes on the electrolytic device is performed in order to be able to replace these electrodes very easily when they are clogged up. The cathodes used in European Patent 71,443 are made from polyurethane foam coated with nickel. This device enables the metallic pollutants contained in the waste waters to be removed. The examples illustrating this European patent show that, with the device according to European Patent 71,443, it is possible to treat only waste waters containing, before treatment, less than 1 g/l of pollutant; using such a cell with more concentrated solutions, such as used photographic developing and fixing solutions, would involve a rapid clogging up of the cell equipped with such electrodes.

British Patent 2,078,782 discloses a means for stirring the electrolyte which consists of imparting to the cathode an oscillating motion around a fixed horizontal axis. This oscillating motion is used in order to form a vortex in the whole electrolyte volume, which enables the mass transfer coefficient to be improved. In the device disclosed in British Patent 2,078,782, the cathode used is flat and non-porous and the oscillating speed is less than 60 rotations per minute (1 Hz), with high amplitudes in order to allow the occurence of vortices in the whole volume of the electrolytic cell. It can be assumed that the oscillating frequency is maintained at a value less than 1 Hz, in order to maintain sufficient electrical conduction between the cathode and electrolyte.

Although these methods aim to improve the mass transfer coefficient, they inevitably involve, however, a deterioration of the conduction of electricity within the electrolyte in the cell. Indeed, the stirring of the electrolyte allows an increase in the mass transfer coefficient due to a greater mass supply of material on the electrolytically active surface but this stirring involves also a deterioration of the Electrolyte— Electrode electronic transfer.

French Patent 2,599,758 discloses a cell having a volume electrode consisting of a pulsed bed of conductive particles. This device makes it possible to obtain a large electrolytically active surface and improved mass transfer and electrical conduction. Indeed, the intermittent stirring which results from the pulsation makes it possible to maintain good electrical conduction.

Although this device is electrochemically effective, it exhibits various drawbacks related to the complexity of and space required for the pulsation device; in addition to the high cost of the resulting equipment, the difficulties in recovering the compound deposited on the particles complicate the use of this device on an industrial scale.

Given the increase in problems related to the discharge of contaminated industrial effluents and the appearance of new and more stringent standards aimed at protecting the environment, it is desirable to be able to have devices and methods which are still more effective, economical and easy to use on an industrial scale for treating industrial effluents.

The present invention relates to an electrolytic device and method for treating effluents, and the recovery, purification and recycling of redox compounds dissolved in these effluents.

This electrolytic device comprises at least one electrode associated at least with one counter-electrode, said electrode being porous and used for stirring, and provided with means enabling it to be moved, the movement of the electrode causing the stirring of the electrolyte in the whole volume of the porous electrode.

After treatment by the device and method according to the present invention, the effluent can be discharged into the sewer without causing any problems related to environmental protection.

This device and method are particularly effective for treating photographic effluents such as used fixing or bleaching-fixing baths which contain a significant amount of silver ions of the order of 6 g/l, which it is desirable to recover before discharging them into the sewer.

After treatment of the photographic effluents by means of the device according to the present invention, the recovered silver can be recycled very easily, for example, by combustion of the silver-coated electrode and, the quantity of silver discharged into the sewer with the effluent is less than 50 ppm.

The means to move the porous stirring electrode according to the present invention can, for example, be electromechanical, pneumatic, or mechanical means.

The stirring of the electrode is used not to stir the whole electrolyte volume, but to create vortices, mainly in the volume of the porous electrode. These vortices cause an increase in the mass transfer coefficient inside the electrode.

The motion of the porous stirring electrode is preferably periodic. The stirring frequency is between 0.1 and 10 Hz, preferably from 0.5 to 5 Hz and the amplitude of the electrode motion is preferably between 1 and 10 cm.

The pore diameter is such that vortices are created in the volume of the electrode. Preferably, it will be between 2 to 10 mm. The pore diameter can be chosen according to the characteristics of the pollutant and its concentration in the effluent to be treated with the device of the invention, in order to avoid an excessively rapid clogging up of the cell. The fixing of the porous stirring electrode to the device according to the invention is such that the electrode can be easily replaced when it is clogged up by the recovered pollutant.

In an embodiment, the porous electrode according to the present invention is made from expanded polymer coated with metal to make it conductive. The diameter of the electrode pores is between 2 and 3 mm.

The counter-electrodes are made from graphite, or metal and conventionally manufactured. For example, graphite bars or cylinders, metal grids or plates or platinum-plated wires, can be used according to the cell type.

According to a preferred embodiment, the electrolyte cell comprises, in a conventional manner, anode and cathode zones and can be equipped with a system for recycling the electrolyte. The porous stirring electrode and the counter-electrode can be separated by a partition or membrane allowing the ions to pass, but not the solution; this partition is, for example, made from porous alumina or a porous plastic material or other materials inert as regards the chemical reactions occuring in the cell.

The control of the electrode potentials at the ends of the particle bed can be performed in a known manner by means of a potentiostat which supplies a continuous voltage at the cell terminals and which keeps the voltage constant between two points of the cell. A "reference" potential, chosen on the intensity-potential curve of the electrochemical reaction considered, is displayed on the potentiostat and continuously compared with the potential measured by the reference electrode. According to the difference recorded between this potential and the reference potential, the potentiostat control device provides an anode potential variation which tends to compensate for this shift. The perturbations thus compensated can be the result of variations in concentration, flow rate, temperature variations, etc.

The device according to the present invention can consist of several electrodes and several counter-electrodes. In this case, the electrodes can have identical or different porosities and the different electrodes can be moved in a synchronous or asynchronous manner.

When the device according to the present invention is used to recover silver ions contained in photographic effluents, the porous stirring electrode is cathodically biased, and the counter-electrode is anodically biased.

When the silver contained in the photographic baths is recovered by conventional electrolysis, the silver is recovered in the form of dendrites having a greyish powdery appearance, and it does not exhibit good adhesion to the cathode. The silver recovered by the method according to the present invention has a very good adhesion to the porous stirring cathode, whatever the degree of stirring of the cathode may be. The cathode is fixed in the device in such a way that this porous cathode can be replaced very easily when it is clogged up. The recycling of the recovered silver is then effected by combustion of the cathode. The organic polymer is destroyed and the recovered silver can be reused.

BRIEF DESCRIPTION OF THE DRAWINGS

FIG. 1a: use of a non-porous non-stirring cathode

FIG. 1b: use of a non-porous stirring cathode

FIG. 1c: use of a porous non-stirring cathode

FIG. 1d: use of a porous stirring cathode (invention)

FIG. 3 shows the working of the present invention when the used fixing solution is recycled in the electrolytic device.

Figure 1:
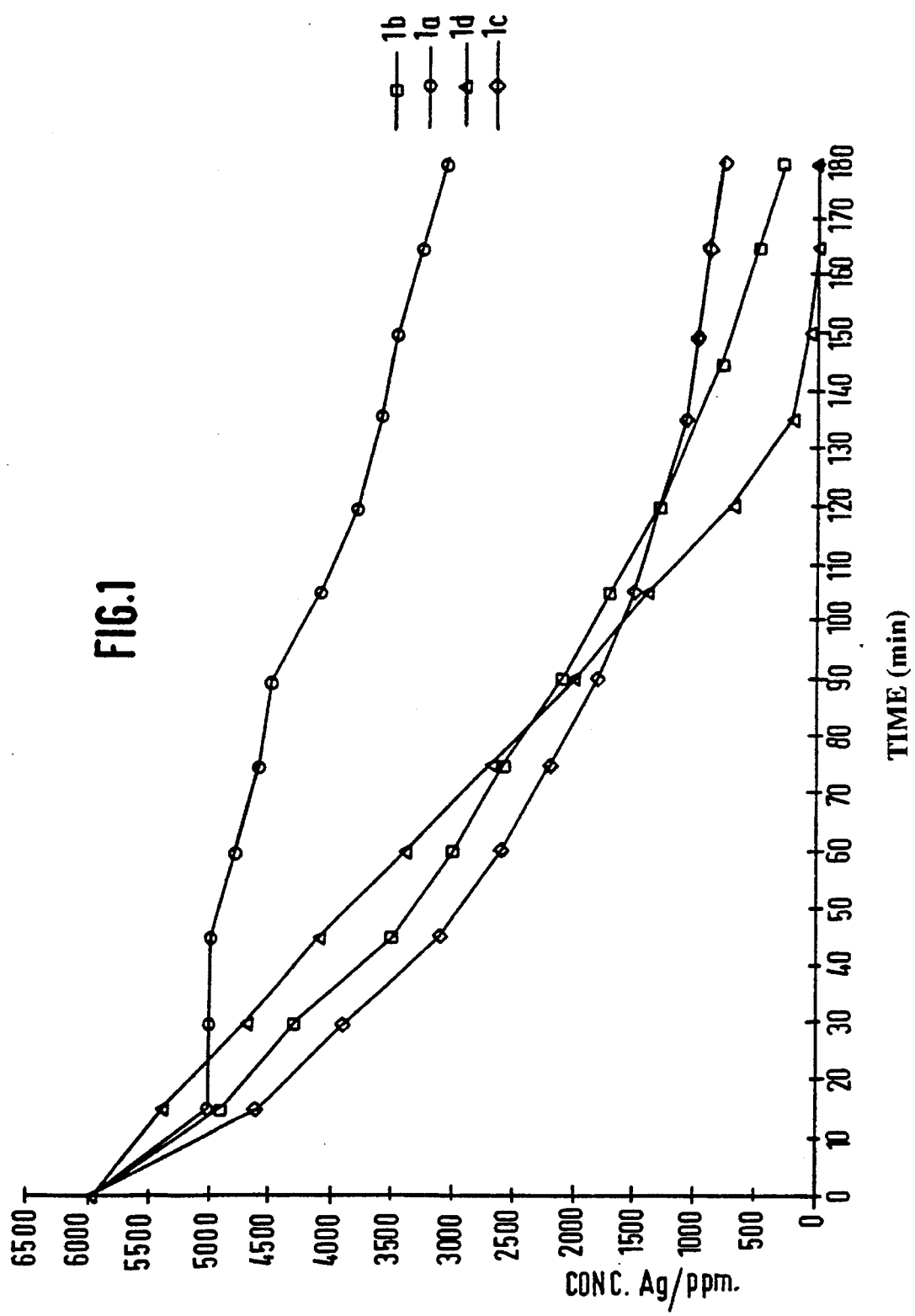
FIG. 1 is a diagram which, for different electrodes applied to the desilvering of a used photographic fixing solution, shows the variation in the quantity of silver ions remaining in solution.
Figure 2:
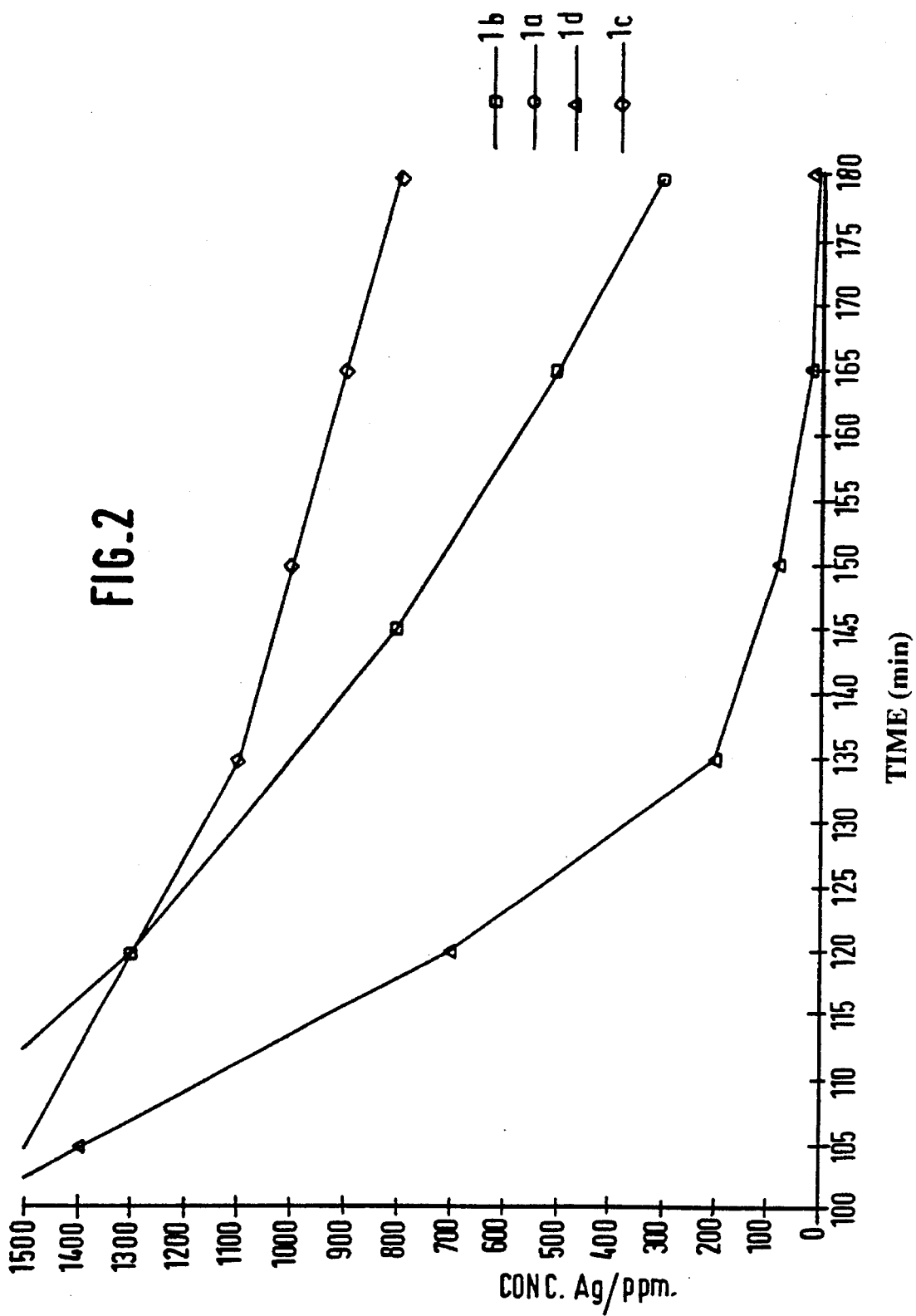
FIG. 2 is an enlargement of FIG. 1.

The different desilvering curves shown in FIGS. 1, 2 and 3 reveal the behaviour differences of the electrodes according to the prior art and according to the invention.

In fact, the prior art electrodes show a decrease in the desilvering rate when the silver concentration in the solution decreases: the activity of these electrodes is related to the silver concentration in the electrolyte.

With the porous stirring electrode, the desilvering rate does not decrease, even when the silver concentration in the electrolyte becomes as low as 200 ppm.

The electrode of the present invention achieves a good compromise by providing good electrical conduction between the electrode and the solution, and a good mass transfer at the electrode surface. The device allows almost total desilvering with a substantially shorter working time than with the prior art electrodes. This result is all the more surprising since, with the electrode of the invention, the decrease of the silver content is less rapid at the beginning of the desilvering than with the electrodes according to the prior art.

The amount of silver deposited by carrying out stirring with the porous electrode is at least 20% more than the amount of silver deposited with the same porous but non-stirring electrode. Moreover, the silver recovered with the cathode of the invention is more adherent and of better quality.

This cell can be used directly on the tanks containing used fixing solution in developing machines.

EXAMPLES

In the following examples, the electrolytic device consists of a conventional electrolytic cell comprising an anode compartment and a cathode compartment separated by a membrane permeable to ions and non-permeable to the solution.

The volume of this cell is 3 liters. It can be equipped with an electrolyte recycling device. The non-porous electrodes (A) used in the comparative examples are nickel plates measuring 100×100×5 mm.

The porous electrodes (B) used in the device of the invention are made from expanded polyurethane foam coated with Ni (2 g/cm$^2$), measuring 100×100×5 mm, the mean diameter of the pores is in the order of 3 mm, the counter-electrodes are stainless steel grids. The electrodes are stirred by means of a mechanical motor/connecting-rod system. In the following examples, the stirring is carried out with an ellipsoidal motion with a frequency of 2 Hz and an amplitude of 5 cm.

In the case of the desilvering of a used fixing solution, the electrolysis is performed at a constant potential of −1000 mV and the current varies from 0.6 to 1.2 A, the electrode disclosed being cathodically biased, and the counter-electrode anodically biased.

EXAMPLE 1

The device disclosed above is used for desilvering a used fixing solution containing 6 g/l of silver. The desilvering of the same fixing solution is performed by means of:

a non-porous non-stirring (A) electrode (comp 1a)

a non-porous stirring (A) electrode (comp 1b)

a porous non-stirring (B) electrode (comp 1c)

a porous stirring (B) electrode (inv 1d)

FIGS. 1 and 2 show the desilvering of the used fixing solution over time for each type of electrode, stirring or non-stirring. The variation in the silver concentration in the electrolyte is monitored by sampling the electrolyte every 10 minutes, and the silver content is determined by atomic absorption determination (ICP: Inductively Coupled Plasma).

It has been possible to demonstrate the efficiency of the device according to the present invention (FIG. 1, 1d and FIG. 2, 1d), which makes it possible to obtain, after 135 minutes of operation, an effluent having a silver content of the order of 200 ppm, while with the other electrodes used, for a same operation time, the silver content in the electrolyte is more than 1000 ppm.

EXAMPLE 2

The device disclosed below with the porous electrode (B) is used with recycling of the electrolyte. The fixing solution to be desilvered contains 6,5 g/l of silver. The electrolyte is sampled every 10 minutes and the silver content is determined by ICP.

FIG. 3 shows the desilvering of the electrolyte over time, using the porous (B) non-stirring (3a) electrode and the porous (B) stirring (3b) electrode of the invention.

After 180 minutes of operation, a difference in desilvering of the order of 1000 ppm is obtained, this desilvering being more effective with the porous (B) stirring electrode.

EXAMPLE 3

The device disclosed below with the porous electrode (B) is used, by continuous supply of the used fixing solution containing 6 g/l of silver at a flow rate of 5 l/h. The table below shows the amount of silver recovered with the porous (B) non-stirring (comparison) electrode and with the porous (B) stirring electrode during the same operating time (180 min).

|   | Porous (B) non-stirring electrode | Porous (B) stirring electrode |
|---|---|---|
| a | 11.545 g | 16.372 g |
| b | 11.763 | 19.391 |
| c | 12.119 | 16.359 |

The amount of silver deposited on the porous (B) stirring electrode is on average 30% more than the amount deposited on the porous (B) non-stirring electrode.

Figure 4B:
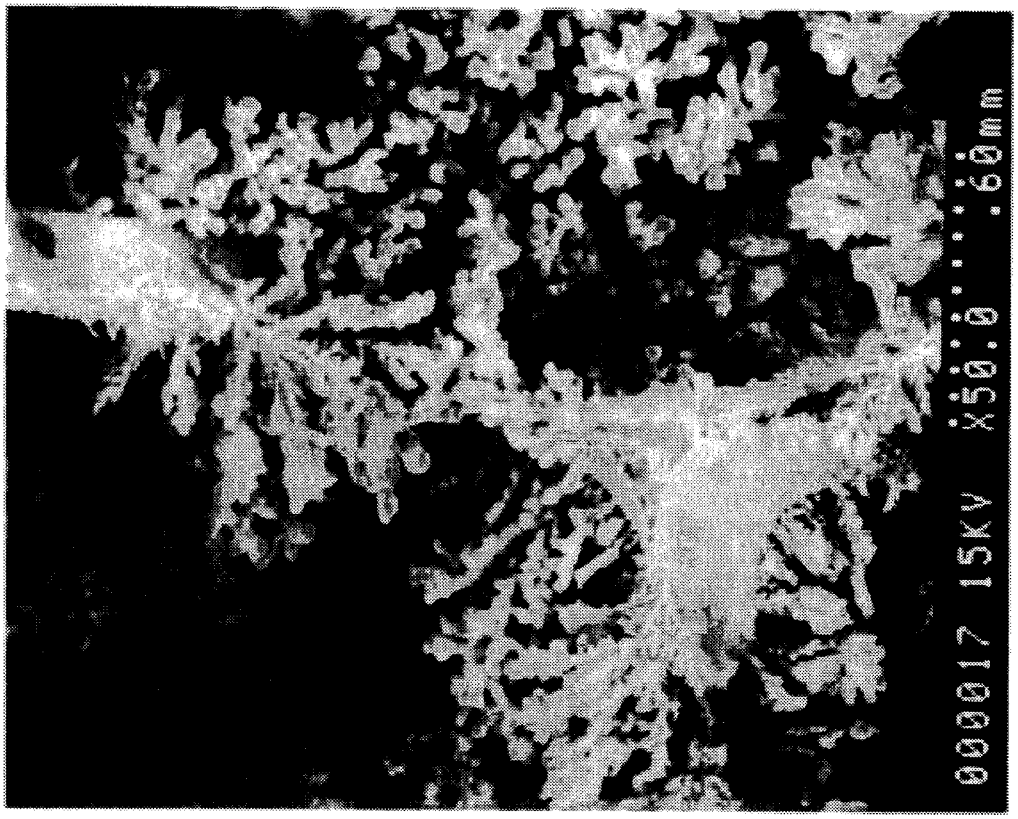
FIGS. 4a and 4b shows the quality of the silver recovered by the electrolytic device.
Figure 4A:
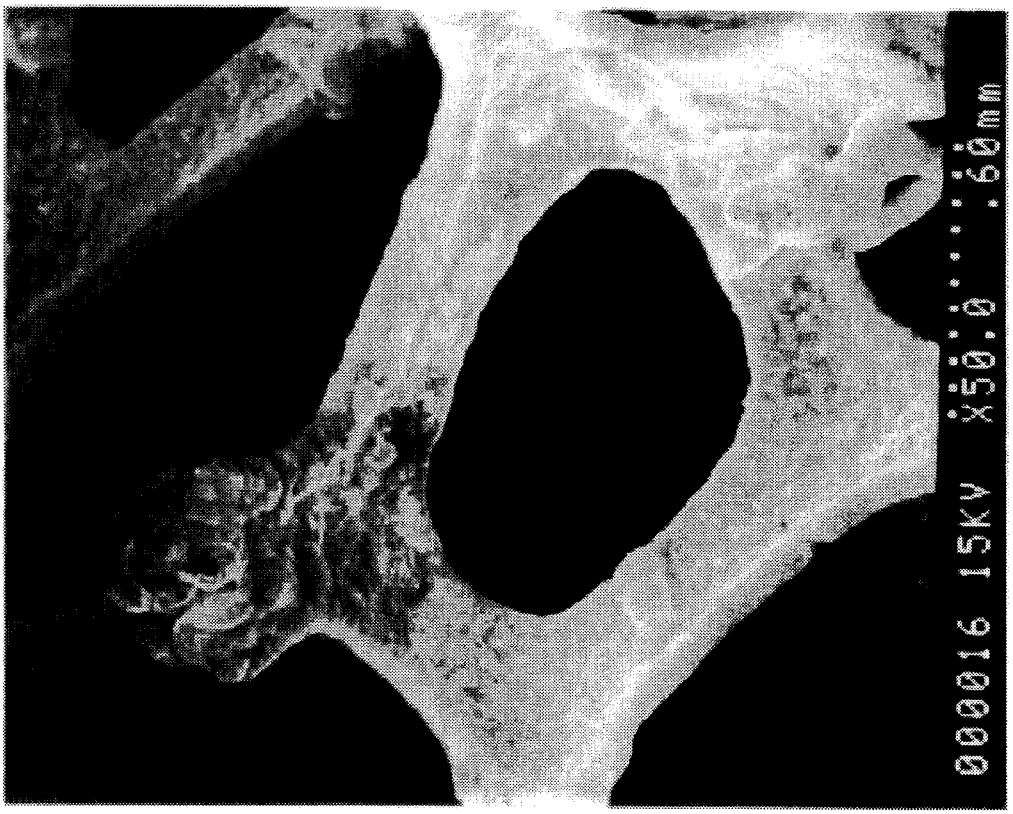

FIG. 4a is a photograph taken by electron microscopy which shows the appearence of the silver recovered by the device according to the present invention.

FIG. 4b shows the appearance of the silver recovered with a porous (B) non-stirring electrode.

The silver deposited on the porous (B) stirring electrode is more adherent and of better quality.

ELECTROLYTIC DEVICE COMPRISING A CELL ENCLOSING A PLURALITY OF ELECTROLYTIC UNITS

Figure 5:
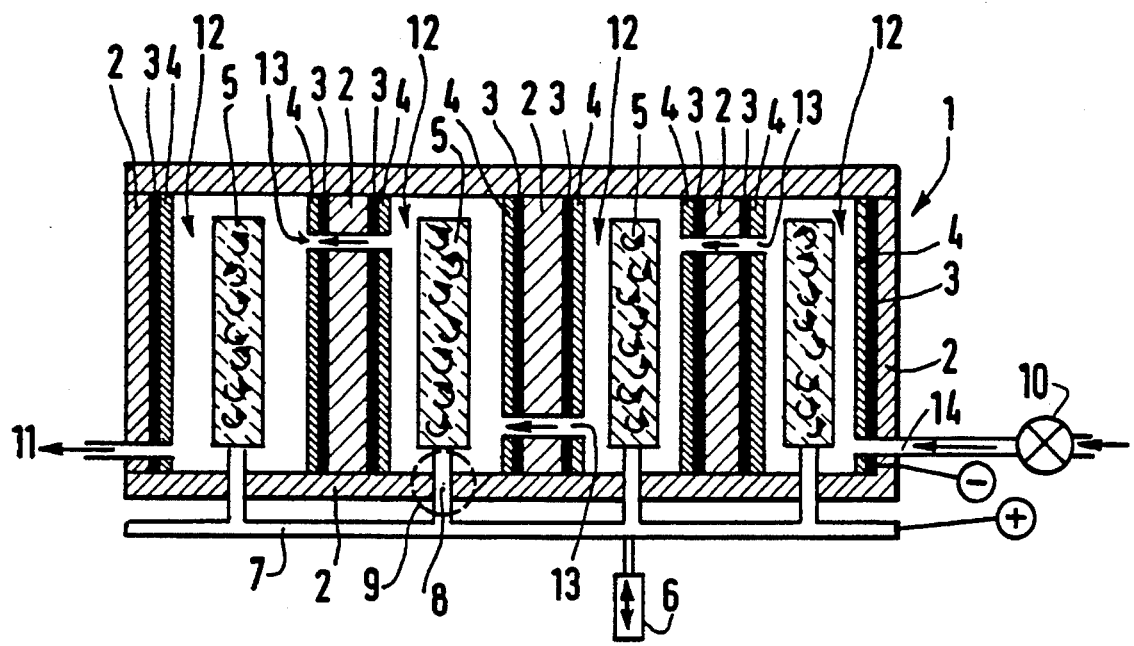
FIG. 5 shows diagrammatically an electrolytic cell comprising electrodes according to the present invention. This cell consists of a chamber (1) produced for example from plexiglass, enclosing a plurality of electrolytic units (12) defined by partitions (2) formed preferably from the same material as the chamber(l). In the embodiment shown, the cell has 4 electrolytic units; it is obvious that a different number of units may be considered. The electrolytic units communicate with each other through holes (13) provided in the partitions (2). Advantageously, these holes are diagonally disposed so as to form baffles for circulating electrolyte within the cell, which makes it possible to increase the holding time of the electrolyte in each unit. Each end of the chamber (1) comprises an orifice; one of them (14), connected to a feed pump (10) and enabling the electrolyte to be introduced into the first unit, and the other one (11) enabling the electrolyte to be discharged from the last unit of the cell. Each electrolytic unit (12) comprises a porous electrode (5) according to the invention, on each side of which are disposed a counter-electrode (3) and a porous membrane (4) enabling oxidation of the chemical species to be prevented. In the embodiment illustrated in FIG. 5, the counter-electrode (3) and porous membrane (4) are bonded to the plexiglass partition (2), the holes of the counter-electrode (3) and the membrane (4) being disposed so as to coincide with the hole (13) provided in the separation partitions (2). Such an arrangement makes it possible to prevent any flow of electrolyte between the partition (2) and the corresponding counter-electrode (3), thus preventing oxidation of the chemical species in solution. According to one embodiment, the counter-electrodes are metal plates and the porous membranes are made from sintered polyethylene or ion exchange membranes. The counter-electrodes of the cell are connected to each other by suitable means, not shown, which are connected to the positive terminal of a DC power supply. The electrodes (5) interposed between the counter-electrodes (3) consist, according to the present invention, of a porous material such as, for example, a polyurethane foam covered with conductive metal. The electrodes (5) have, according to the present invention, a rapid reciprocating motion within each electrolytic unit. By way of example, in the embodiment shown, the electrodes of the cell are connected to each other, at their bottoms, by an intermediate piece (7) driven in a reciprocating motion by means of a device of the pneumatic jack type (6). Other means, well known to the expert, can be used to produce this movement. The electrodes are supplied with current by means of current supply rods (8) passing through the bottom wall of the chamber (1) and connected to the negative terminal of a DC power supply. In the embodiment shown in FIG. 5, these current supply rods also provide the mechanical connection of the electrodes to the intermediate piece (7). According to another embodiment, the electrodes individually have the said reciprocating motion. The arrows shown inside the cell (12) illustrate the path followed by the electrolyte in the said cell. The watertightness of the cell at the point where the current supply rods (8) pass through the bottom wall of the chamber (1) is ensured by means which will be discussed in more detail below.
Figure 6:
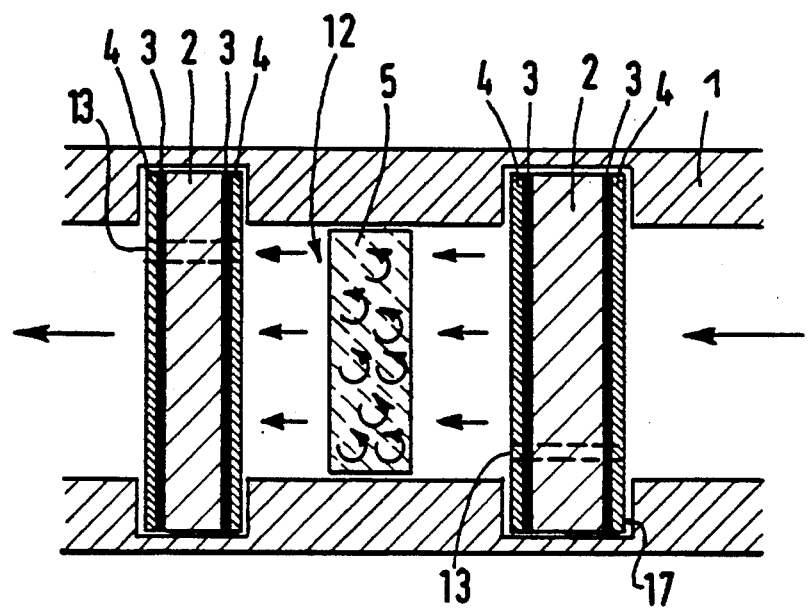
FIG. 6 illustrates a plan view of the cell according to the present invention. The parts common to those shown in FIG. 5 are designated by the same numerical references. As shown, the holes (13) in two successive separating partitions are disposed opposite each other (one at bottom right, the other at top left). The assemblies formed by a separating partition (2), two counter-electrodes (3) and two porous membranes (4) are held inside the cell by grooves (17) provided in the two opposite lateral walls of the chamber (1).
Figure 7:
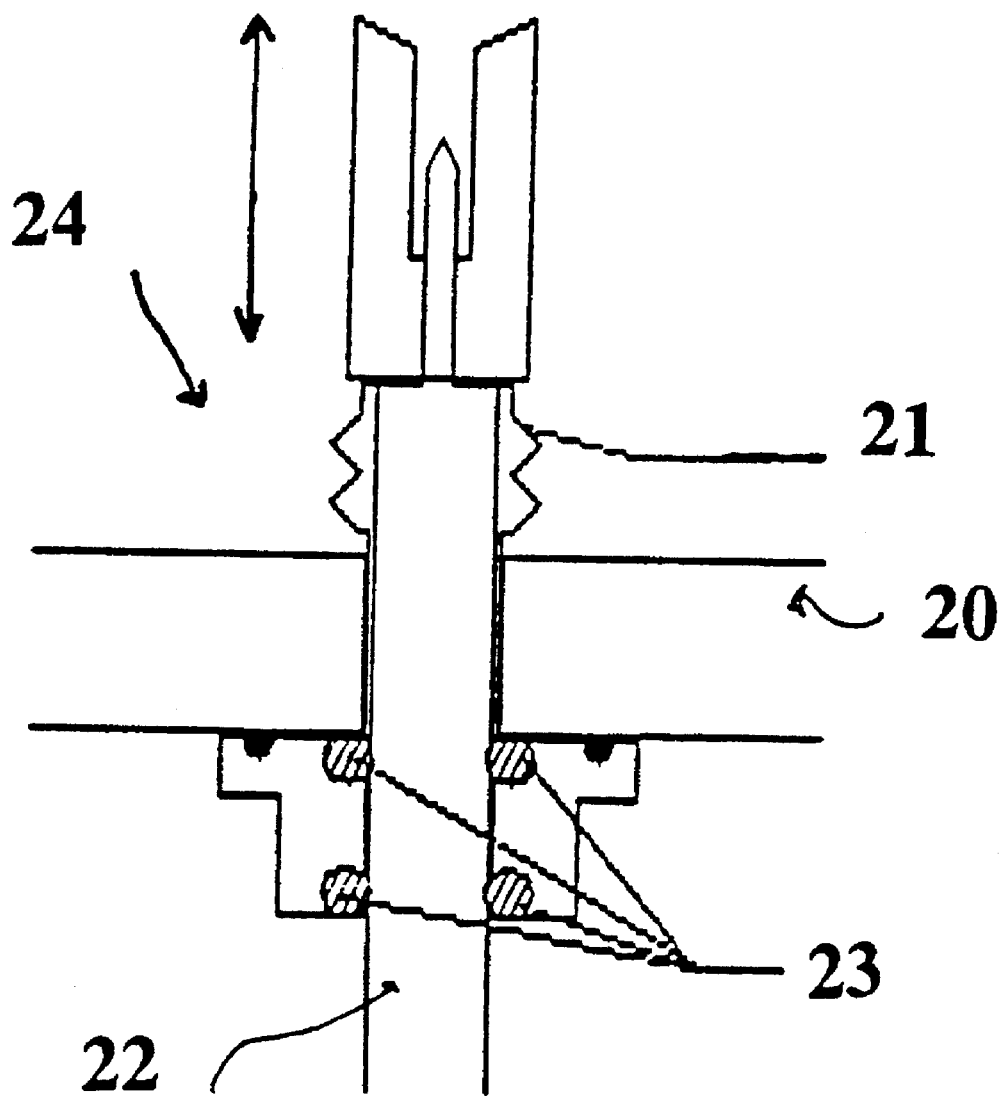
FIG. 7 shows an enlargement of the part (9) delimited in dotted lines in FIG. 5 and illustrates diagrammatically the means used to ensure watertightness of the cell at the points where the current supply rods (22) pass through the bottom wall (20) of the cell chamber. This watertightness is ensured by means of a bellows (21), surrounding the current supply rod (22) and isolating the joints (23) from the electrolysis area. Such an arrangement makes it possible to prevent the rapid deterioration of the joints (23) which would inevitably result from the rubbing of the rod (22), which would be coated with metal during the electrolysis, on the joints (23). The bellows (21) in fact makes it possible to prevent any deposition of metal on the current supply rod(22), thus reducing wear on the joints (23) to a considerable-extent. By way of example, these bellows are made from polyvinyl chloride or polyethylene terephthalate.

In the following example, the electrolytic device consists of an electrolytic cell as shown in FIGS. 5, 6 and 7, enclosing 10 electrolytic units (Total Volume of the cell: 50 liters). The porous electrode is the same as the electrode used in the preceding examples.

The electrode motion is of the order of 5 cm with a frequency of 0.5 Hz.

The feed flow rate is of the order of 1000 l/h.

The experiments are performed with 100 liters of a used fixing solution containing 6 g/l of silver, circulating in closed circuit.

EXAMPLE 4

The cell disclosed above is used with variable intensities of current supply.

Figure 8:
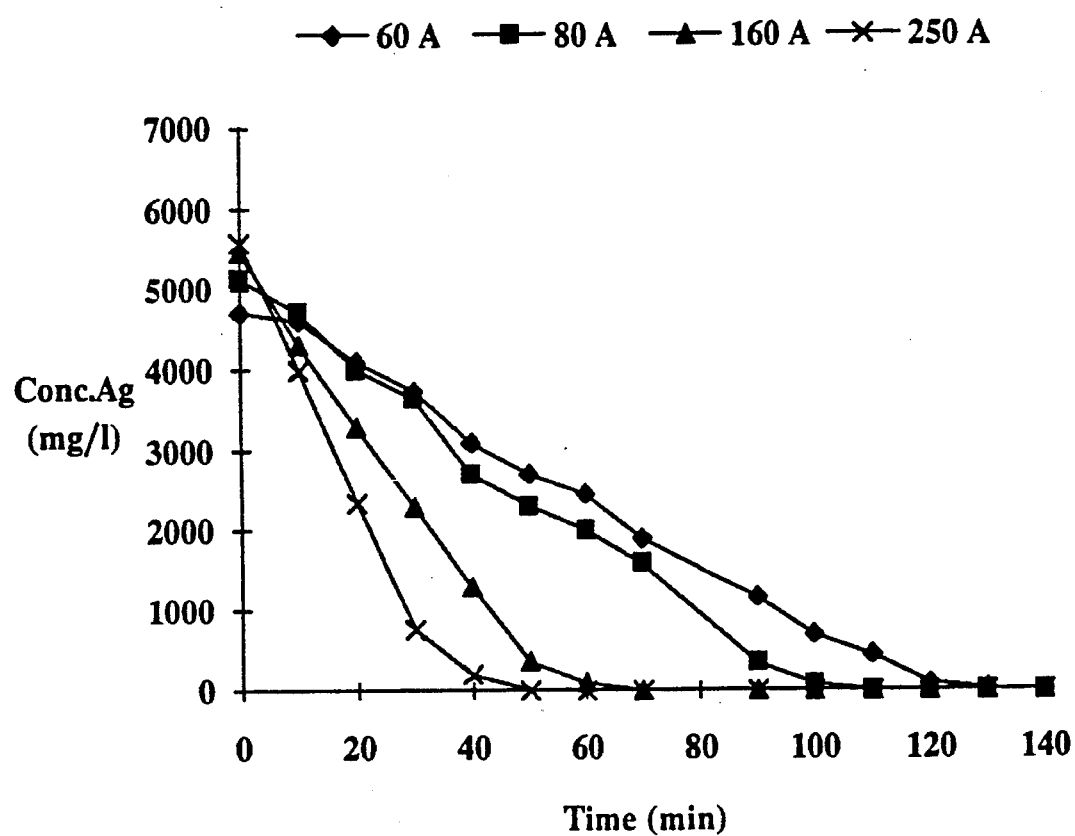
FIGS. 8, 9 and 10 are diagrams which, for the electrode of the present invention, show the desilvering of a used photographic fixing solution containing 6 g/l of silver over time. The electrolysis is performed in closed circuit with an electrolytic cell as described in FIGS. 5, 6 and 7, enclosing 10 electrolytic units.

FIG. 8 shows the desilvering of the used fixing solution over time, for intensities of current between 60 and 250 A.

Figure 9:
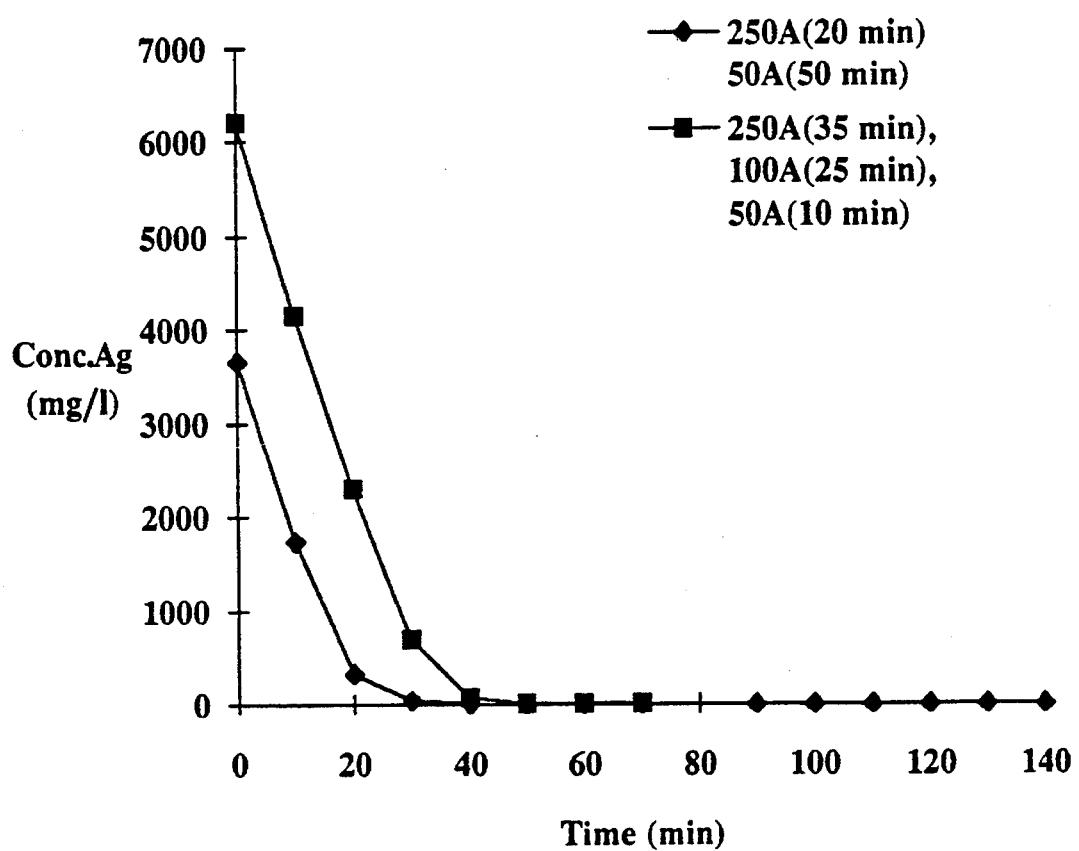

FIG. 9 shows the desilvering of the used fixing solution over time, for an intensity of current varying between 250 and 50 A during the operation time in order to avoid sulphurizing of the fixing solution.

Figure 10:
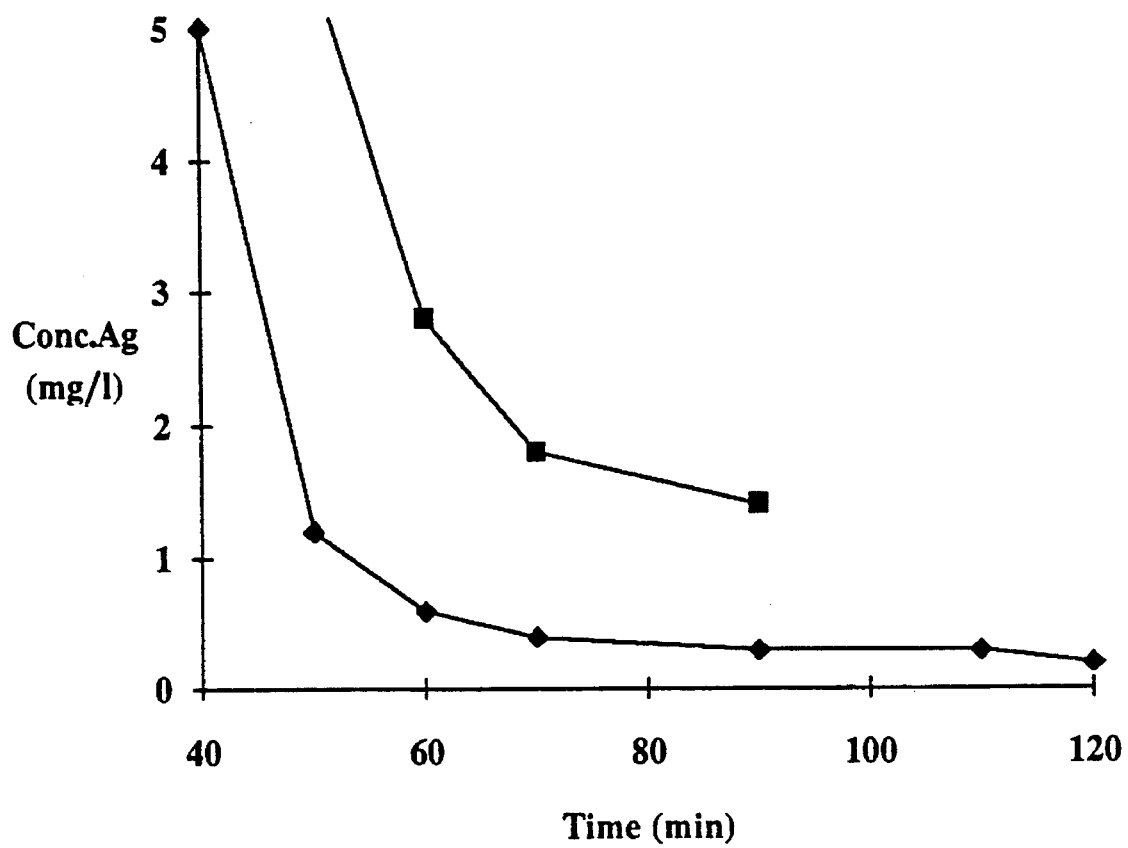

FIG. 10 is an enlargement of FIG. 9 which shows the desilvering of the fixing solutions when the silver concentration is less than 5 mg/l. As shown in FIG. 10, the final silver concentration is as low as 0.2 mg/l.

Figure 11:
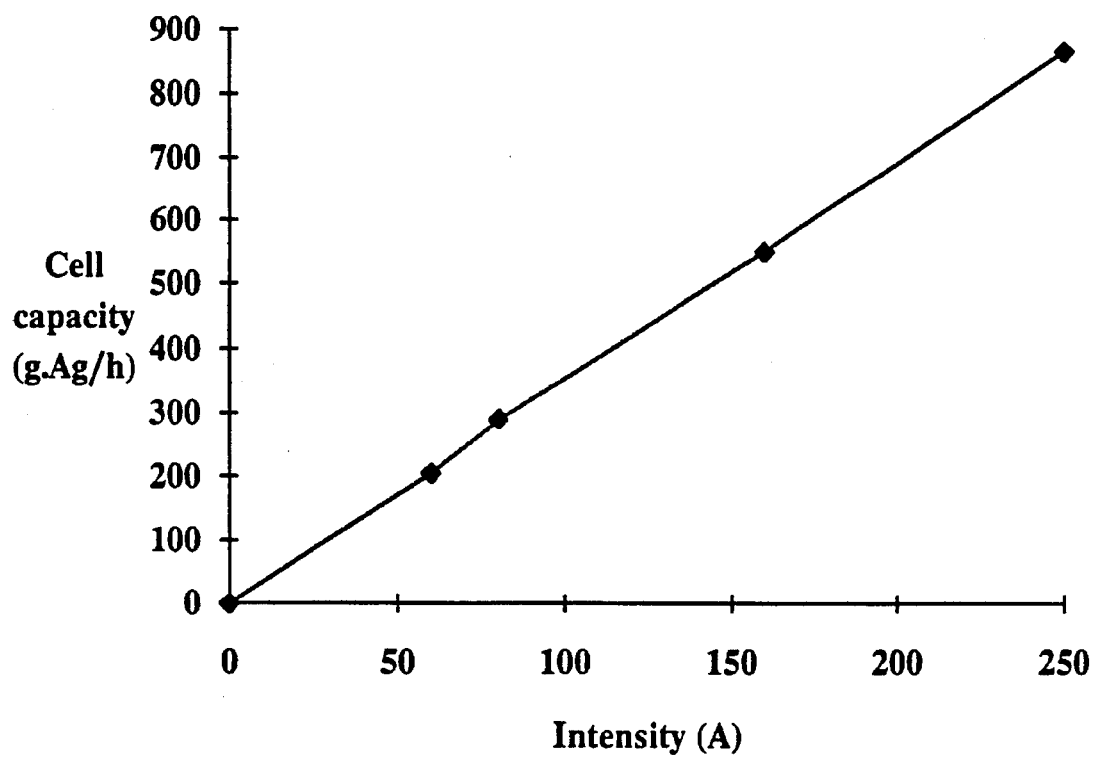
FIG. 11 shows the variations of the cell capacity (g/h of silver) over the intensity of current supply.

FIG. 11 shows the desilvering capacity (expressed in g/h of silver) of such a cell over the intensity of current supply. The linearity of the curve shows that the cell capacity can be easily increased by using a higher current supply.

We claim:

1. An electrolytic device comprising at least one electrode associated with at least one counter-electrode, characterized in that at least one electrode of the electrolytic device is porous and used for stirring, the said electrode being provided with means enabling this electrode to be moved, the movement of the electrode bringing about the stirring of the electrolyte in the porous electrode volume wherein the porous stirring electrode and the counter-electrode are separated by a membrane permeable to ions but non-permeable to the solution, the porous stirring electrode is made from an expanded organic polymer coated with metal, and the electrode porosity is such that the diameter of the pores in the electrode is between 2 and 10 millimeters.

2. An electrolytic device according to claim 1, wherein the electrode is made from an expanded polyurethane foam coated with nickel.

3. An electrolytic device according to claim 1, wherein the electrolyte cell consists of a chamber (1) enclosing a plurality of electrolytic units (12) defined by partitions (2), the electrolytic units communicating with each other through holes (13) formed in the partition (2), each electrolytic unit (12) comprising a porous stirring electrode (5) on each side of which are disposed a counter-electrode (3) and a porous membrane (4), said counter-electrode (3) and porous membrane (4) being provided with holes coinciding with the holes formed in the partition (2).

4. An electrolytic device according to claim 3, wherein the holes (13) of adjacent electrolytic units are diagonally disposed so as to form baffles for circulating electrolyte within the cell.

5. An electrolytic device according to claim 3, wherein the watertightness of the cell at the points where current supply rods (22) pass through the bottom wall (20) of the cell is ensured by sealing means (23), a bellow (21) being provided so as to surround the current supply rod (22) and isolate the sealing means (23) from the electrolysis area.

6. The device of claim 1 wherein said device is a device for silver recovery.

7. An electrolytic device according to claim 1, wherein the watertightness of the cell at the points where current supply rods (22) pass through the bottom wall (20) of the cell is ensured by sealing means (23), a bellow (21) being provided so as to surround the current supply rod (22) and isolate the sealing means (23) from the electrolysis area.

8. An electrolytic method for recovering metals contained in an electrolyte comprising the steps of:

providing an electrolytic device comprising at least one electrode associated with at least one counter-electrode, wherein at least one electrode of the device is porous and used for stirring, wherein the porous stirring electrode and the counter-electrode are separated by a membrane permeable to ions but non-permeable to the solution, the porous stirring electrode is made from an expanded organic polymer coated with metal, and the electrode porosity is such that the diameter of the pores in the electrode is between 2 and 10 millimeters, wherein the porous stirring electrode is cathodically biased and the counter electrode is anodically biased, providing said porous electrode with means enabling said porous electrode to be moved, the movement of the porous electrode bringing about stirring of the electrolyte in the porous electrode volume, stirring the porous electrode at a frequency of between 0.1 and 10 Hz with an amplitude of between 1 and 10 cm, and wherein metal ions contained in the electrolyte are reduced when contacting the porous stirring electrode, said porous stirring electrode being coated with metal ions reduced during an electrochemical reaction.

9. An electrolytic method according to claim 8, wherein the porous electrode is stirred intermittently.

10. An electrolytic method according to claim 8, wherein the porous electrode is stirred continuously.

11. An electrolytic method according to claim 8 for recovering the silver contained in photographic baths.

* * * * *